Figure 2:
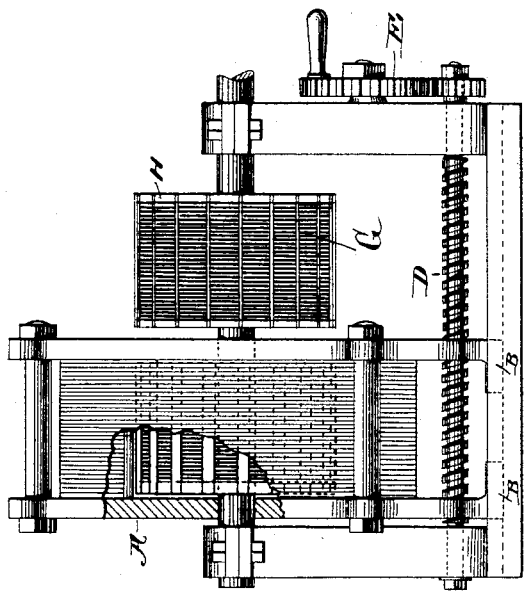

(No Model.) 2 Sheets—Sheet 1.

C. S. BRADLEY.
ALTERNATING CURRENT MOTOR.

No. 514,902. Patented Feb. 20, 1894.

Attest:
C. W. Benjamin.
C. C. Grigg.

Inventor;
Charles S. Bradley
by Read & Price
his attys.

(No Model.) 2 Sheets—Sheet 2.

C. S. BRADLEY.
ALTERNATING CURRENT MOTOR.

No. 514,902. Patented Feb. 20, 1894.

Attest,
E. C. Grigg.
H. G. Tuckerman.

Inventor,
Charles S. Bradley
By Read & Prier
his Attys.

UNITED STATES PATENT OFFICE.

CHARLES S. BRADLEY, OF AVON, NEW YORK.

ALTERNATING-CURRENT MOTOR.

SPECIFICATION forming part of Letters Patent No. 514,902, dated February 20, 1894.

Application filed September 27, 1892. Serial No. 447,079. (No model.)

*To all whom it may concern:*

Be it known that I, CHARLES S. BRADLEY, a citizen of the United States, residing at Avon, in the county of Livingston and State of New York, have invented certain new and useful Improvements in Alternating-Current Electric Motors; and I do hereby declare the following to be a full, clear, and exact description of the invention, such as will enable others skilled in the art to which it appertains to make and use the same.

This invention relates to alternating current electric motors and is particularly applicable to that type of motor in which the magnetizing current in one of the elements is a secondary current developed by the inductive action of a rotary magnetic field and flows through a continuously closed circuit.

The object of the invention is to enable the motor to start with a strong torque. The peculiarity of the class of motors referred to is that by reason of the excessive slip between the secondary circuit and the rotary magnetic field when the motor is starting, the induction is so great as to cause the poles developed by the induced circuit to overpower the poles of the rotary field, and it is customary to interpose in the induced circuit when the motor is starting a suitable resistance which can be cut out when the motor gets up to speed. Such resistance being external to the circuit with which it is to co-operate involves the necessity of contact rings upon the shaft of the rotating element and co-operating brushes.

It is one object of my invention to dispense with an external resistance.

I carry out my invention by providing two secondary circuits mounted on the same shaft, one of high resistance and the other of low resistance, and placing in co-operative relation thereto an inducing circuit adapted to develop a rotary magnetic field, said inducing circuit being adjustable so as to be brought into active relation to either of the secondary circuits. In this way the high resistance induced circuit may be brought into action when the motor is starting, and by reason of its high resistance lowers the magnetizing effect of the induced current and permits the field-magnet and armature poles to co-operate to the best advantage and develop a maximum torque. When the motor attains its speed and the percentage of slip between the induced circuit and the poles of the rotary field is reduced and the induction consequently more moderate the inducing circuit is shifted so as to co-operate with a low resistance secondary circuit, thus developing a stronger current at that speed and preserving the torque of the motor.

Figure 1:
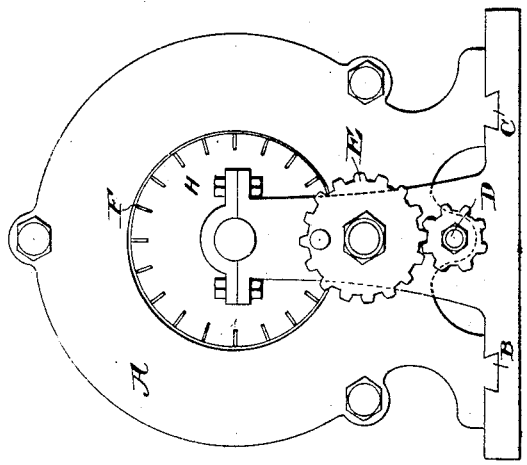
Figure 4:
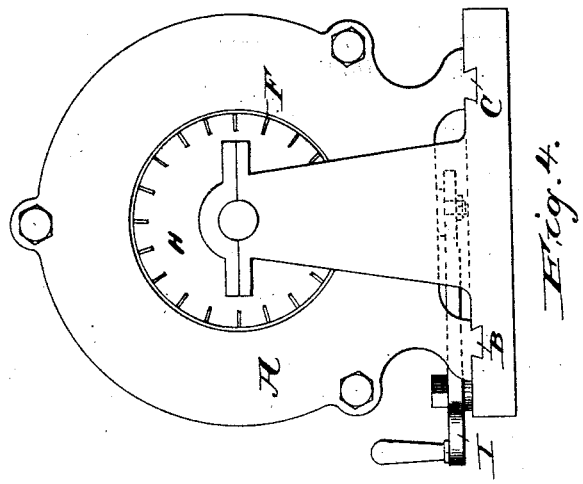
Figure 3:
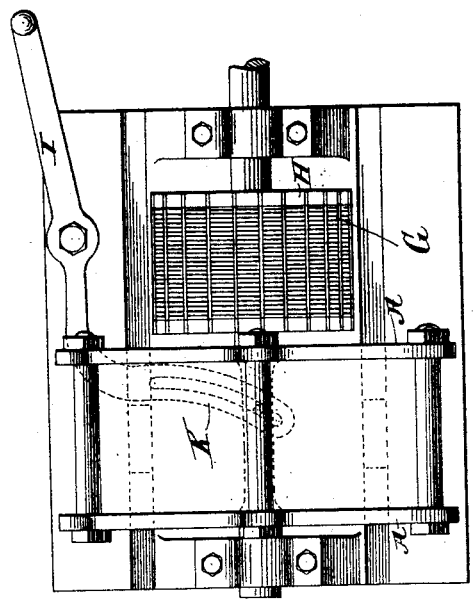

In the accompanying drawings which illustrate my invention, Figure 1 is an end elevation of a motor embodying my improvements. Fig. 2 is a side elevation of the same with part broken away; part of the windings being omitted for clearness of illustration. Fig. 3 is a plan view of a modification, and Fig. 4 is an end elevation of the same.

It is well understood that if a polyphase alternating current be led at a number of points into a closed circuit inclosing a ring core that a rotary magnetic field is set up in the core and that if within this core there is placed a secondary circuit, the conductors of which are adapted to cut the lines of force of the rotary magnetic field, a strong secondary current may be induced in this circuit.

In Fig. 1 A represents a ring core formed of thin laminæ of sheet iron in which a rotary magnetic field is developed by suitable polarizing coils connected with a polyphase alternating current circuit. The supporting standards of the field core are provided with undercut tongues B, C, sliding in grooves in the base of the motor, and co-operate with a screw D controlled by a hand wheel E and co-operating pinion. Within the core A is supported a shaft upon which are mounted two secondary circuits. These circuits comprise a series of radial copper bars F inserted in grooves formed in a laminated ring G constituting what is generally denominated as the armature of the motor. The bars F are in good electric connection with copper disks or rings H at the end of the armature. When a rotary or alternating field is set up in the outer core the lines of force cutting the conductors F induce strong secondary currents which polarize the armature G. The induction is so strong when the motor is starting, by reason of the great amount of slip and the consequent rapid cutting of lines of force, that the armature poles overpower the poles of the rotary field and the torque is weak. In order to obviate this difficulty I provide two armatures, one of which is indicated in full and the other in dotted lines, either of which may be inclosed by the core of the rotary field. One of these armatures is provided with an inducing circuit of low resistance, and the other one of comparatively high resistance, as indicated by the dotted and full lines.

In starting the motor the field is adjusted so as to inclose the high resistance secondary element and the strength of the current developed by the excessive slip in starting is lowered so as to have a moderate magnetizing effect upon the armature core, permitting it to co-operate to the best advantage with the poles of the rotating field and develop a maximum torque. After the motor has attained a sufficient speed the field is shifted so as to inclose the other armature, which, by reason of the lower resistance of its circuit, permits a current of the same ampère strength to be developed in the secondary circuit by a less amount of slip, and thus preserves a high torque in the motor at the increased speed. I have indicated in the high resistance circuit simple straight bars. The size or number of these bars may be varied to any extent desired to bring the resistance of the secondary circuit to the best working condition, or, any suitable provision be made to render the resistance of one of the secondary circuits greater than that of the other. This construction permits not only of an attainment of a high torque on starting but permits the speed of the motor to be maintained irrespective of the load, or permits the speed to be varied if desired when the load is constant. Such a result can be accomplished by shifting the field so as to partially inclose both armatures, and by a proper graduation the speed or torque may be varied to suit the work in hand. In Figs. 3 and 4 is shown a simpler device for shifting the field with respect to the secondary circuit convenient for use on small motors. In this case a simple lever I pivoted to the base of the motor is provided with a forked or slotted arm K cooperating with a pin secured beneath the sliding field. By operating the lever the field may be quickly shifted from a position of active relation to one armature to a position of active relation to the other.

The improvements herein described are applicable to all motors of the induction type, wherein an alternating field developed by the primary element reacts inductively upon a secondary element and develops rotation.

Having thus described my invention, what I claim as new, and desire to secure by Letters Patent, is—

1. An alternating current motor having a primary element, two secondary elements, one of high and the other of low resistance, and means for shifting the elements relatively so that the primary may cooperate with either secondary.

2. An alternating current motor having a primary element and two closed secondary circuits on the other element, one of high and the other of low resistance, and means for shifting the elements relatively so that the primary may cooperate with either or both secondary circuits.

In testimony whereof I affix my signature in presence of two witnesses.

CHARLES S. BRADLEY.

Witnesses:
 HENRY J. MILLER,
 OCTAVIA STEWART.